US006433769B1

(12) United States Patent
Cato

(10) Patent No.: US 6,433,769 B1
(45) Date of Patent: Aug. 13, 2002

(54) COMPENSATION CIRCUIT FOR DISPLAY CONTRAST VOLTAGE CONTROL

(75) Inventor: Robert Thomas Cato, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/477,744

(22) Filed: Jan. 4, 2000

(51) Int. Cl.[7] .................... G09G 3/36; G09G 5/00; H04N 9/73; H04N 5/14; H04N 5/52

(52) U.S. Cl. .................... 345/101; 345/211; 348/673; 348/678; 348/687; 348/655; 348/657

(58) Field of Search .................... 345/101, 211, 345/212, 132; 348/730, 673, 678, 687, 657, 655; 323/273; 219/216; 340/324; 395/110

(56) References Cited

U.S. PATENT DOCUMENTS

| | | | | | |
|---|---|---|---|---|---|
| 3,921,162 | A | * | 11/1975 | Fukai et al. | 340/324 |
| 4,442,381 | A | * | 4/1984 | Numata | 315/151 |
| 4,542,281 | A | * | 9/1985 | Thompson | 219/216 |
| 5,066,945 | A | | 11/1991 | Kanno et al. | 340/784 |
| 5,233,339 | A | | 8/1993 | Newman et al. | 340/784 |
| 5,252,955 | A | | 10/1993 | Davis et al. | 345/87 |
| 5,317,332 | A | | 5/1994 | Kanno et al. | 345/101 |
| 5,414,441 | A | | 5/1995 | Memarzadeh et al. | 345/87 |
| 5,416,495 | A | | 5/1995 | Davis et al. | 345/87 |
| 5,532,718 | A | * | 7/1996 | Ishimaru | 345/211 |
| 5,534,889 | A | * | 7/1996 | Reents et al. | 345/132 |
| 5,627,457 | A | | 5/1997 | Ishiyama et al. | 323/318 |
| 5,754,577 | A | * | 5/1998 | Casper et al. | 372/38 |
| 5,861,861 | A | | 1/1999 | Nolan et al. | 345/87 |
| 5,926,618 | A | * | 7/1999 | Watanabe et al. | 395/110 |
| 6,157,178 | A | * | 12/2000 | Montanari | 323/273 |
| 6,252,355 | B1 | * | 6/2001 | Meldrum et al. | 315/150 |
| 6,307,765 | B1 | * | 10/2001 | Choi | 363/134 |

* cited by examiner

*Primary Examiner*—Bipin Shalwala
*Assistant Examiner*—David L. Lewis
(74) *Attorney, Agent, or Firm*—J. Bruce Schelkopf; Winstead Sechrest & Minick

(57) ABSTRACT

The present invention discloses a contrast control method and circuitry for setting and compensating the contrast of a liquid crystal display (LCD). The present invention has circuitry for generating a contrast voltage normally applied to a control pin. Normally the actual contrast of the LCD is a sensitive function of the difference between the applied contrast voltage and the display power supply voltage. The present invention generates a reference voltage that is adjustable and made to vary inversely with temperature. The contrast control circuitry uses a feedback loop to make the difference voltage between the display power supply voltage and the contrast voltage equal to twice the reference voltage. A contrast setting made using the circuitry of the present invention now becomes independent of the display power supply voltage and compensated for variations in the temperature of the LCD. A high gain amplification method for reducing error voltages and providing wide dynamic range is also disclosed.

31 Claims, 5 Drawing Sheets

COMPENSATION CIRCUIT FOR DISPLAY CONTRAST VOLTAGE CONTROL

TECHNICAL FIELD

The present invention relates in general to display systems and to data processing systems which incorporate display systems, and in particular to liquid crystal displays (LCD) employing contrast control compensated for variations in power supply voltage and temperature.

BACKGROUND INFORMATION

Liquid crystal displays (LCDs) are used in many applications as the display of choice because of their small size, low power and low cost. As with any display system, users sometimes want to adjust the contrast between the displayed information and the background. LCDs typically have a contrast input voltage that is used to vary the contrast on a particular display. The contrast is a function of the power supply voltage used on the display and the voltage that is applied to the contrast control pin. The voltage that will generate a particular contrast depends on the display temperature and the actual supply voltage at the time an adjustment was made. If a user sets a contrast level, subsequent variations in the power supply voltage or temperature would require the user to re-adjust the contrast control to maintain the desired contrast.

Many approaches have been implemented in the prior art to deal with the problem of sensitivity of the contrast control setting to variations in power supply voltage and temperature. Some LCD systems try to compensate for only one of the variables while others use rather complex systems of microprocessors, analog to digital (A/D) converters, sensors and feedback systems to compensate for variations that occur when the LCD's power supply voltage or its ambient temperature vary.

In many LCD systems it is also desirable to have only one voltage to power the display and the circuitry within the display. Having only one power supply voltage can create additional problems in the dynamic range required for contrast control over possible variations in temperature and power supply voltage. Sometimes it is desirable to have a contrast control voltage that is near the level of the display power supply voltage. This dynamic range has led some display system designs to use multiple voltages for the LCD system. As a result, what is needed in the art is a simple and cost effective analog system for providing contrast control for a LCD system using only one supply voltage for the display as well as the contrast control circuitry.

Many modern data processing systems, including but not limited to personal computers, laptop or portable computers use LCDs s as output devices. These data processing systems are operated where it is desirable to have a LCD with an automatic contrast control adjustment. Therefore, the foregoing needs are particularly applicable to such data processing systems that employ a LCD as the primary or as one of the displays for system information.

SUMMARY OF THE INVENTION

The present invention addresses the foregoing needs by providing an improved contrast control method and electronic circuitry to implement the contrast control method. More specifically the present invention provides a method where the difference between the display supply voltage and the contrast control voltage are made proportional to a reference voltage which itself is linearly and inversely proportional to temperature. One embodiment of the present invention also uses a novel circuit configuration to enable a high gain and a wide dynamic range for controlling the difference in the display voltage and the contrast control voltage.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
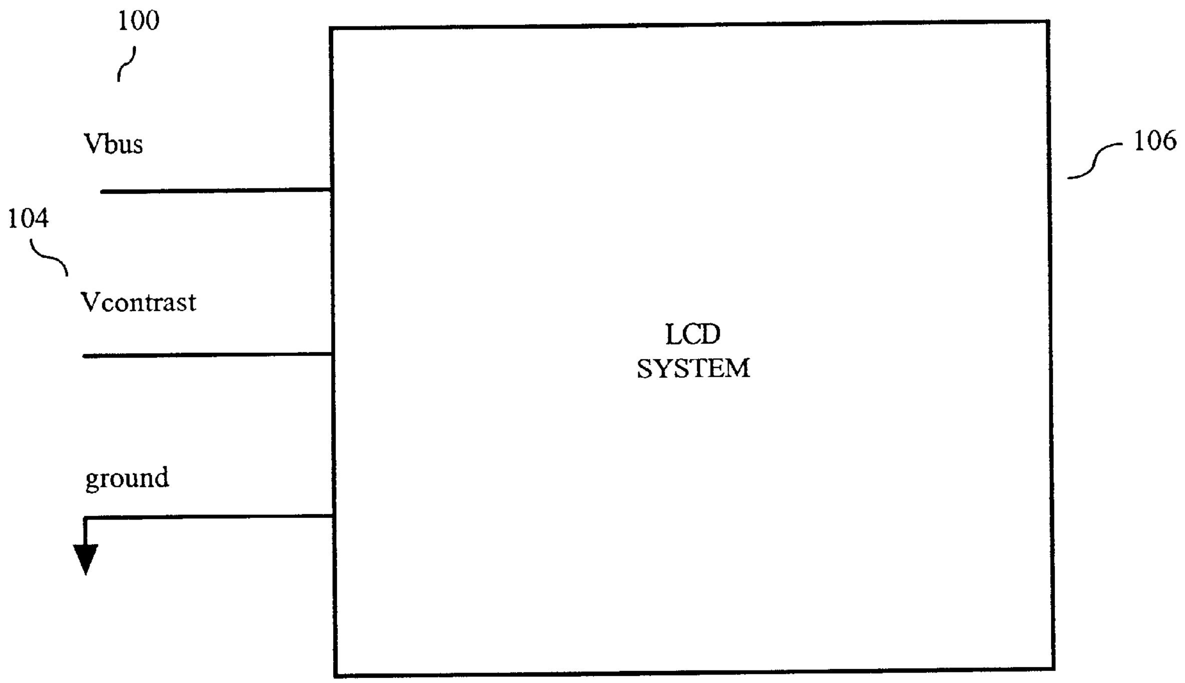
FIG. 1 is a block diagram of a typical LCD display.

In the following description, numerous specific details are set forth such as specific voltages or resistor values, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

FIG. 1 is a simple block diagram showing a LCD system 106, power supply voltage $V_{BUS}$ 100 and contrast voltage $V_{CONTRAST}$ 104. $V_{BUS}$ 100 is a regulated display power supply voltage and $V_{CONTRAST}$ 104 is a control voltage applied to a control pin to change contrast. If no compensation were provided, LCD 106 would have a contrast level seen by a viewer which may vary. The difference between $V_{BUS}$ 100 and $V_{CONRAST}$ 104, which effects the contrast of a LCD, varies if either $V_{BUS}$ 100 or $V_{CONTRAST}$ undergo variations. $V_{BUS}$ 100 may vary from regulation and $V_{CONTRAST}$ can vary due to drift, temperature or component aging in its generation circuitry.

Figure 2:
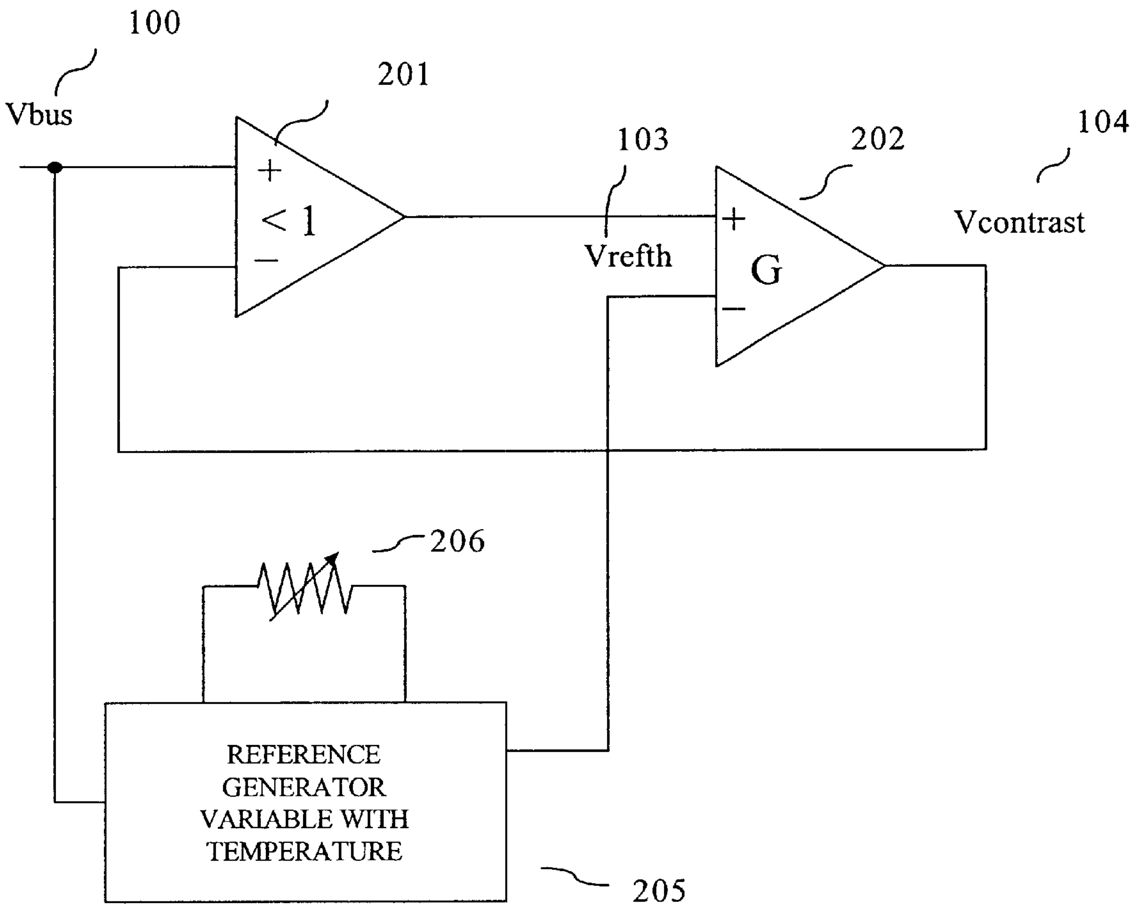
FIG. 2 illustrates a schematic of an embodiment of the present invention.

FIG. 2 illustrates several features of the present invention. The displayed contrast on LCD 106 is dependent on the difference between the display power supply voltage $V_{BUS}$ 100 and the contrast control voltage $V_{CONTRAST}$ 104. Differential amplifier 201 generates the difference between $V_{BUS}$ 100 and $V_{CONTRAST}$ 104. Differential amplifier 202 generates the difference between the output of amplifier 201 and a generated reference voltage $V_{REFTH}$ 103. The output of amplifier 202 is this difference voltage amplified by a gain G and the output of amplifier 202 becomes the contrast voltage $V_{CONTRAST}$ 104. The voltage $V_{CONTRAST}$ 104 is used as a feedback to the negative input of differential amplifier 201. $V_{CONTRAST}$ 104 can be shown to be the following:

$$V_{CONTRAST}=[V_{BUS}-V_{CONTRAST}-V_{REFTH}]\times G$$

If G is large (>>*l*) then the difference between $V_{BUS}$ 100 and $V_{CONTRAST}$ 104 can be shown to approach the following:

$$V_{BUS}-V_{CONTRAST}=V_{REFTH}$$

$V_{REFTH}$ 103 is a reference voltage that is independent of $V_{BUS}$ 100, optionally adjustable by varying resistor 206 and made to vary linearly with temperature. Since the viewed contrast level is a function of the difference between the supply voltage $V_{BUS}$ 100 and the contrast voltage $V_{CONTRAST}$ 104, the compensation system shown in FIG. 2 generates a viewed contrast level that is independent of supply voltage $V_{BUS}$ 100. Since a previously set contrast level would need to also be adjusted from the set value if the temperature changed, the reference generator 205 is designed to have the required variation in $V_{REFTH}$ 103 necessary to keep a set contrast at a viewer's desired value.

In many LCD systems, it is desirable to have a single power supply voltage for all elements in the system. In an embodiment of the present invention, a single power supply voltage, $V_{BUS}$ 100, is used to generate $V_{REFTH}$ 103 and to power the amplifiers needed to generate the compensated contrast level control. If a single power supply is used, there are times when the desired voltage, $V_{BUS}$ 100 minus $V_{CONTRAST}$ 104, becomes very nearly equal to the power supply voltage $V_{BUS}$ 100. The reference voltage $V_{REFTH}$ 103 would need to be nearly equal to the voltage from which it is generated. In this case, the $V_{REFTH}$ generator 205 would have to be more complex and more costly. The simple circuit of FIG. 2 is not used because of the high gain required in differential amplifier 202 and the desire to use a single supply voltage. If amplifier 202 was a closed loop amplifier with a necessary high gain G, then the circuit would be prone to potential stability problems.

Figure 3:
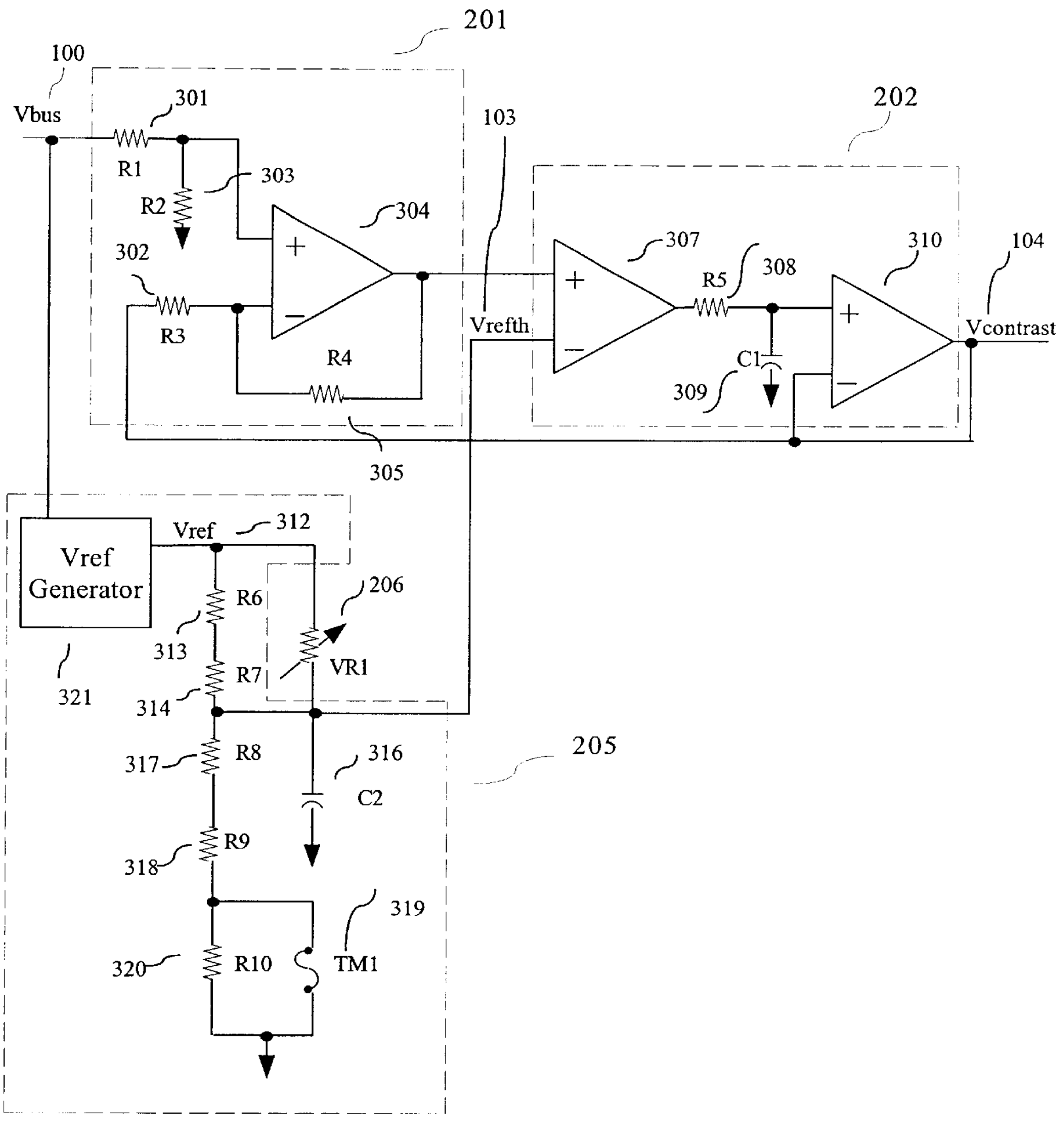
FIG. 3 illustrates a schematic of an electronic circuit implementation of the present invention.

FIG. 3 illustrates an embodiment of the present invention where all of the considerations discussed have been implemented. FIG. 3 illustrates the three main elements (differential amplifier 201, differential amplifier 202 and $V_{REFTH}$ generator 205) of FIG. 2 in dotted lines. The embodiment of the present invention shown in FIG. 3 uses the same power supply voltage, $V_{BUS}$ 100, to power the LCD 106, to generate the reference voltage $V_{REFTH}$ 103 and to power the amplifiers 304, 307, and 310. Since the difference voltage $V_{BUS}$ 100−$V_{CONTRAST}$ 104 has a dynamic range that takes it near the supply voltage $V_{REF}$ 312, resistors 301 and 303 are used to divide $V_{BUS}$ 100 by two and resistors 302 and 305 are used to divide $V_{CONTRAST}$ 104 by two $V_{REFTH}$ 103 can now be derived from $V_{BUS}$ 100 with a simple zener diode circuit or a simple three terminal bandgap reference circuit and a resistor divider. Amplifier 307 now has as its inputs ($V_{BUS}$ 100−$V_{CONTRAST}$ 104)/2 and $V_{REFTH}$ 103. $V_{REFTH}$ 103 can now be less than $V_{REF}$ 312 and $V_{BUS}$ 100−$V_{CONTRAST}$ 104 can be two times $V_{REFTH}$ 103. In one embodiment of the present invention $V_{BUS}$ 100 is 5 volts and $V_{REF}$ 312 is 2.5 volts.

Most modem operational amplifiers used to make differential amplifiers can have their output voltage operate very near their supply voltages. Operational amplifiers are characterized by high input impedance and a very high but variable differential gain. To stabilize the gain of a particular amplifier, negative feedback is used to make the closed loop gain of a stage the ratio of two resistors. A very high closed loop gain in a stage may result in instability because of the large resistors necessary and parasitic capacitance.

The present invention solves this problem by operating amplifier 307 open loop to achieve the highest gain possible. The inputs to amplifier 307 are very nearly equal when the error is the smallest. As the controlled voltage, $V_{BUS}$ 100−$V_{CONTRAST}$ 104, moves above and below $V_{REFTH}$ 103 the high gain of amplifier 307 causes its output to switch from its most positive value ($V_{BUS}$ 100) and its most negative value (ground). The output of amplifier 307 is integrated or averaged with resistor 308 and capacitor 309. Amplifier 310 is operated as a voltage follower and buffers or isolates the integrator so it is not loaded by the input impedance of differential amplifier circuit 201 when $V_{CONTRAST}$ 104 is fed back to resistor 302. The average value on the output of amplifier 307 becomes the desired contrast voltage necessary to generate a desired set contrast level on the LCD.

The reference generator circuit 205 has a resistor divider circuit comprised of resistors 313, 314, 317, 318, optional variable resistor 206, capacitor 316, and thermistor 319. The reference voltage $V_{REF}$ 312 can be generated with a zener diode, a commercially available three terminal bandgap reference, or using an other suitable reference circuit. On LCDs that have an optional customer set contrast level, variable resistor 206 is used to vary the contrast level of the LCD. After a particular contrast is set the circuitry of the present invention will maintain the contrast with variations in display supply voltage and display temperature. Resistor 320 is added in parallel to thermistor 319 to change the slope of its temperature versus resistance curve. Inexpensive thermistors may not have the required temperature versus resistance curve needed for a particular LCD.

Resistors 313 and 314 allow a non-standard resistor value to be realized in one leg of the resistor divider with standard resistor values. Resistors 317 and 318 serve the same purpose in the other leg of the resistor divider. The resistors are sized to give the desired range of values for the reference voltage $V_{REFTH}$ 103.

Figure 4:
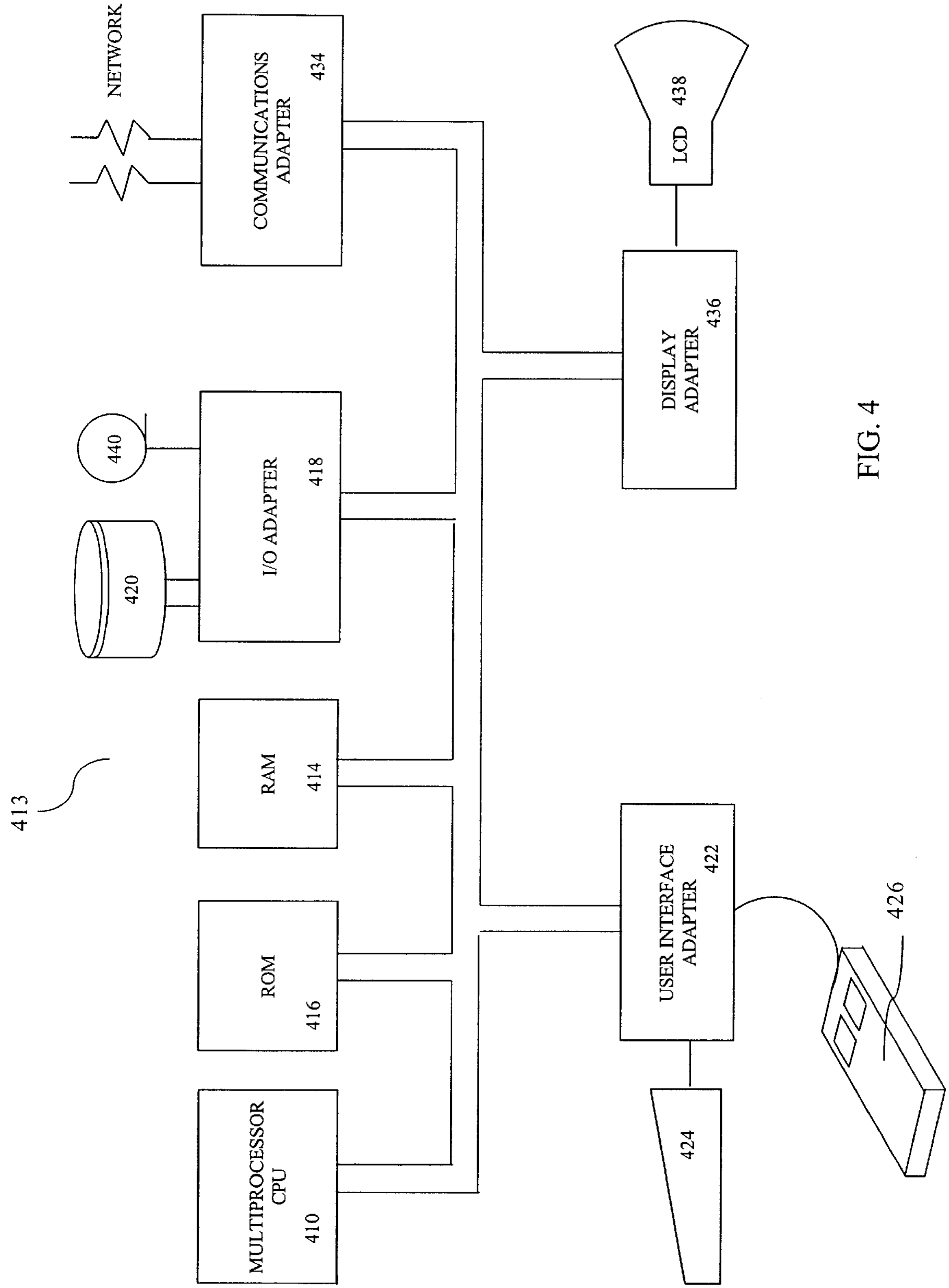
FIG. 4 is a block diagram of a data processing system employing a LCD with the contrast control of the present invention.

A representative hardware environment for practicing the present invention is depicted in FIG. 4 which illustrates a typical hardware configuration of workstation 413 in accordance with the subject invention having central processing unit (CPU) 410, such as a conventional microprocessor, and a number of other units interconnected via system bus 412. Workstation 413 includes random access memory (RAM) 414, read only memory (ROM) 416, and input/output (I/O) adapter 418 for connecting peripheral devices such as disk units 420 and tape drives 440 to bus 412, user interface adapter 422 for connecting keyboard 424, mouse 426, and/or other user interface devices such as a touch screen device (not shown) to bus 412, communication adapter 434 for connecting workstation 413 to a data processing network, and display adapter 436 for connecting bus 412 to LCD 438. LCD 438 would employ the contrast control of the present invention. CPU 410 may include other circuitry not shown herein, which will include circuitry commonly found within a microprocessor, e.g., execution unit, bus interface unit, arithmetic logic unit, etc. CPU 410 may also reside on a single integrated circuit.

Figure 5A:
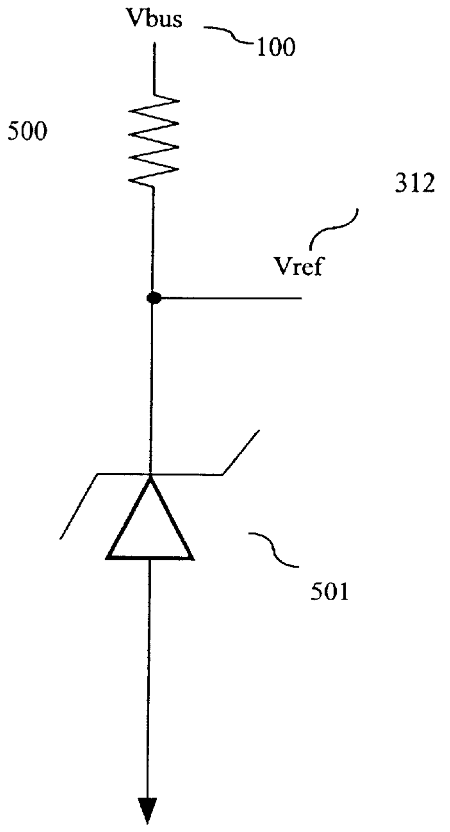
FIG. 5A illustrates a zener diode reference circuit.
Figure 5B:
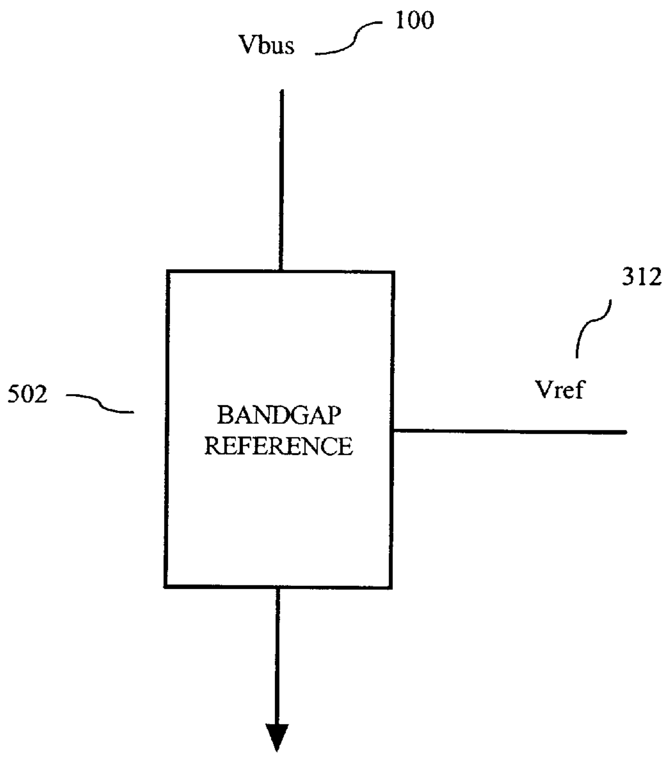
FIG. 5B illustrates a three terminal bandgap reference circuit.

FIG. 5A illustrates a zener diode circuit using $V_{BUS}$ 100, resistor 500, and zener diode 501 for generating $V_{REF}$ 312. FIG. 5B illustrates a three terminal bandgap reference 502 for generating $V_{REF}$ 312. Either of these circuits or other reference circuits could be used to generate a reference voltage $V_{REF}$ 312 that is independent of variations in $V_{BUS}$ 100.

Although the present invention and its advantages have been described in detail, it should be understood that various changes, substitutions and alterations can be made herein without departing from the spirit and scope of the invention as defined by the appended claims.

What is claimed is:

1. A method for automatically controlling the contrast on a display comprising the steps of:

generating a first voltage as a difference between a display power supply voltage and a contrast voltage for modifying said contrast of said display;

generating a variable compensated reference voltage independent of said display power supply voltage, said reference voltage linearly proportional to a temperature of said display; and generating said contrast voltage as an amplified difference between said first voltage and said variable compensated reference voltage.

2. The method of claim 1, further comprising the step of:

adjusting said variable compensated reference voltage to change said contrast of said display.

3. The method of claim 1, further comprising the steps of:

amplifying the difference between said first voltage and said variable reference voltage with an open loop high gain amplifier;

integrating the output of said open loop high gain amplifier; and dividing a fixed reference voltage with a resistive voltage divider to generate said variable reference voltage.

4. The method of claim 3, further comprising the steps of:

providing a thermistor as one resistor in said resistive voltage divider; and generating said fixed reference voltage by zener diode regulation of said display power supply voltage.

5. The method of claim 3, further comprising the steps of:

providing a temperature sensitive resistor as one resistor in said resistive voltage divider; and generating said fixed reference voltage with a three terminal bandgap regulator.

6. A circuit for adjusting contrast of a display comprising:

a reference generator that is linearly proportional to a temperature of said display;

a first differential amplifier having a first gain, an output, a positive input receiving said display power supply voltage and a negative input; and a second differential amplifier having a second gain, an output, a positive input coupled to said output of said first differential amplifier and a negative input receiving a reference voltage from said reference generator, said output of said second differential amplifier coupled to said negative input of said first differential amplifier and said second differential amplifier producing at its output a contrast control voltage.

7. The circuit of claim 6, wherein said first gain is less than one.

8. The circuit of claim 7, wherein said second gain is much greater than one.

9. The circuit of claim 8, wherein said first gain is one-half.

10. The circuit of claim 9, wherein said display power supply voltage is a power supply for said first and second differential amplifiers and said reference generator.

11. The circuit of claim 10, wherein said first differential amplifier is an operational amplifier with a gain of one-half with respect to said negative input of said first differential amplifier.

12. The circuit of claim 11 wherein said second differential amplifier is an operational amplifier operated in open loop.

13. The circuit of claim 12, wherein said output of said second differential amplifier is integrated or averaged before it becomes said contrast control voltage and is fed back to said negative input of said first differential amplifier.

14. The circuit of claim 12, wherein said reference generator comprises:

a fixed reference voltage;

a resistive voltage divider with a first resistor connected to said fixed voltage reference and a temperature sensitive resistor connected to said first resistor and to ground; and a capacitor connected to an output of said resistive voltage divider.

15. The circuit of claim 14, wherein a variable resistor is in parallel with said first resistor and said temperature sensitive resistor is in series with a second resistor and in parallel with a third resistor.

16. The circuit of claim 15, wherein said variable resistor is operable to adjust said adjustable reference voltage and thus to set a contrast level of said display.

17. The circuit of claim 16, wherein said fixed reference voltage is generated by zener diode regulation of said display power supply voltage.

18. The circuit of claim 16, wherein said fixed reference voltage is generated by a three terminal bandgap regulator.

19. A data processing system comprising:

a central processing unit (CPU);

random access memory (RAM);

read only memory (ROM);

a display device;

a display adapter coupled to said display device; and a bus system for coupling said CPU to said RAM, ROM, and display adapter, wherein said display device farther comprises:

a display power supply;

a reference generator that is linearly proportional to temperature;

a first differential amplifier having a first gain, an output, a positive input receiving said display power supply voltage and a negative input; and a second differential amplifier having a second gain, an output, a positive input coupled to said output of said first differential amplifier and a negative input receiving a reference voltage from said reference generator, said output of said second differential amplifier coupled to said negative input of said first differential amplifier and said second differential amplifier producing on said second differential amplifier output a contrast control voltage.

20. The data processing system of claim 19, wherein said first gain is less than one.

21. The data processing system of claim 20, wherein said second gain is much greater than one.

22. The data processing system of claim 21, wherein said first gain is one-half.

23. The data processing system of claim 22, wherein said display power supply voltage is a power supply for said first and second differential amplifiers and said reference generator.

24. The data processing system of claim 23, wherein said first differential amplifier is an operational amplifier with a gain of one-half with respect to said negative input of said first differential amplifiers.

25. The data processing system of claim 24, wherein said second differen tial amplifier is an operational amplifier operated in open loop.

26. The data processing system of claim 25, wherein said output of said second differential amplifier is integrated or averaged before it becomes said contrast control voltage and is fed back to said negative input of said first differential amplifier.

27. The data processing system of claim 26, wherein said reference generator comprises:

a fixed reference voltage;

a resistive voltage divider with a variable resistor connected to said fixed voltage reference and a temperature sensitive resistor connected to said variable resistor and to ground; and a capacitor connected to an output of said resistive voltage divider.

28. The data processing system of claim 27, wherein said variable resistor is in parallel with a first resistor and said temperature sensitive resistor is in series with a second resistor and in parallel with a third resistor.

29. The data processing system of claim 28, wherein said variable resistor is operable to adjust said reference voltage.

30. The data processing system of claim 29, wherein said fixed reference voltage is generated by zener diode regulation of said display power supply.

31. The data processing system of claim 29, wherein said fixed reference voltage is generated by a three terminal bandgap regulator.

* * * * *